United States Patent Office 3,201,265
Patented Aug. 17, 1965

3,201,265
FIREPROOFING COMPOSITION
Olaus T. Hodnefield, Montrose, Calif., assignor of
fifty percent to Kay O. Anderson
No Drawing. Filed Nov. 23, 1962, Ser. No. 239,810
11 Claims. (Cl. 106—15)

This is a continuation in part of my allowed application Serial No. 834,652, filed August 19, 1959.

The present invention relates to a flame retarding composition which slows the rate of oxidation of a combustible material, more particularly to the type adapted to be applied to combustible materials by dipping or spraying.

Hitherto, the flame retardant compositions which have been used in construction projects, industrial applications, and for homes and farms have been mixtures of chemical agents in a water base. Water was used as a base, of course, because it is inexpensive and readily available in the large amounts required. However, this type of formulation cannot be used for certain applications since a "blistering" effect is encountered when heat is applied causing bubbles to form. "Blistered" surfaces are unsightly and offer the further disadvantage that they soon crack and peel leaving exposed surfaces of combustible material. This precludes use where appearance is important. It is hazardous since the exposed surface of combustible material can act as a nucleus which may be fired and lead to loss of an entire structure, notwithstanding flame retardant on other surface areas.

Another undesirable and dangerous characteristic of these compositions is occasional production of noxious odors and gases, some of which may be toxic, so that they may only be used in the open air.

The present invention has as an object a flame retardant composition free from water and not subject to the above disadvantages.

Another object of the present invention is to provide a flame retardant composition in which hydrocarbons are used as a dispersing medium in place of water.

A further object is a flame retardant composition wherein hydrocarbons are employed as a dispersion medium, aided by halogenated organic solvents and powerful mechanical peptizers whereby a colloidally dispersed mixture is obtained.

Yet a further object of the invention is a flame retardant composition capable of withstanding direct blowtorch heating for one hour without any substantial damage taking place.

It has now been discovered that a heat-resistant, flame-retarding composition may be prepared in which a fire-retarding mineral filler is uniformly colloidally dispersed in a hydrocarbon dispersion medium. Notwithstanding the combustible nature of the hydrocarbon, the composition is capable of withstanding a temperature of 2000° F. for over one hour without permitting a flame to continue spontaneously. The composition is a concentrate which may be dispersed in a larger quantity of organic material, such as asphalt and hence shipped to a consumer who supplies asphalt or other material procured locally.

This concentrate is prepared in a series of peptizing and blending operations in which the components of the hydrocarbon dispersion medium are mixed and fire retardant mineral and chemicals are added. The peptizing and blending may be carried out at room temperature.

The following are the components of the composition. Unless otherwise indicated, all parts and percentages are by weight, based on the weight of the final fireproofing concentrate.

*Coal oil.*—The coal oil may be such as that obtained from crude petroleum or the crude oil from the destructive distillation of bituminous coal. Also, high quality grade, commercial kerosene and pearl oil may be used. The amount used is ½–1%.

*Wetting agents.*—These include anionic materials such as sodium dodecylbenzene sulfonate and other alkylaryl sulfonates, sodium salt of alkyl naphthalene sulfonic acid, sodium lauryl sulfate, sorbitan sesquioleate and other non-ionic materials. Aerosol OT (dioctyl sodium sulfosuccinate) or the sodium octyl phosphate having the formula $Na_5R_5(P_3O_{10})_2$ where R is an ethyl hexyl group, etc. The amount is about 0.1 to 1.5%.

*Phosphatide.*—These are selected from a group of compounds which yield, on hydrolysis, phosphoric acid, an alcohol, a fatty acid and a nitrogenous base. They are widely distributed in nature and include such substances as lecithin, cephalin and sphingomyelin. The amount used is $1/10$–$7/100$%.

*Organic solvent.*—This is selected to assure an absolute thorough dispersion of the inert fire retardant material. Perchloroethylene ($C_2Cl_4$) is preferred. The amount is about 1.2 to 1.6%.

*Protective colloidal soap.*—This assists complete dispersion and assures retention of such state of complete dispersion during periods of shipping and storage. A very desirable group of materials have been found to be ethanolamine oleates such as monoethanolamine oleate or triethanolamine oleate. This colloidal soap may be prepared independently by reacting about 3 to 4 parts of monoethanolamine to one part of the oleic acid. However, the amounts of these may be the same and the monoethanolamine and oleic acid may be added directly to the composition without prior reaction.

Other suitable soaps are morpholine oleate or similar organic base soaps of oleic acid or any other unsaturated or saturated higher fatty acid such as a stearic acid or myristic acid. However, of this class, ethanolamine oleate is preferred. Further, any of the alkaline earth metal soaps of any of these higher fatty acids may be used, such as the calcium or barium soaps, e.g., calcium oleate and barium stearate, all of which are oil soluble, as are the organic soaps of such acids, such as above indicated. The amount of soap used is about 0.5–10% based on the weight of flame retardant mineral filler.

*Pale oil.*—A non-drying, mineral "pale" oil having a flash point around 250° F. or somewhat higher. Oils of about S.A.E. 10 viscosity grade are of this type. This oil helps to soften the final product and is added in an amount of about 1–100%, preferably about 50%, of the protective colloidal soap. The pale oil is a hydrocarbon distillate from the residue of petroleum which has been treated with acid and soda and washed to a light degree of color and the above-indicated S.A.E. grade. Being somewhat heavier than other additives, vigorous stirring is required to effectuate thorough blending.

*Anti-foam agent.*—Suitable materials include those readily available commercially for anti-foam action. A satisfactory material is the water-dilutable oil-in-water emulsion containing polymeric methyl siloxane as the active agent. The amount used is from about 1 part in 100,000 to a few parts in ten thousand.

*Plasticizers.*—These include conventional plasticizers which are added because of the large quantities of solid filler used to facilitate compounding and improve the desirable properties of the finished product. Any commercially acceptable plasticizers may be used such as a tricresyl phosphate and other aryl phosphate esters or aromatic and aliphatic carboxylic esters such as dibutyl phthalate and dioctyl phthalate. The amount is about 0.1 to 2%.

*Copper compound.*—A suitable material is a mixture of about 1 part copper oxide with three parts of hexahydrobenzoic acid. Also useful is copper naphthenate. The amount used is about 0.1–5%.

*Insecticide and/or fungicide.*—This may be added as necessary. For example, there may be added an alkali metal fluoride such as sodium fluoride in an amount of about 0.05–0.2%.

*Alkali metal borate.*—Borax ($Na_2B_4O_4 \cdot 10H_2O$) is preferred in an amount of about 20–60%.

*Phosphate.*—Inorganic phosphates may be used such as ammonium phosphates. One suitable material is diammonium hydrogen phosphate. The amount used is about 8–12%.

*Fire retardant mineral filler.*—Suitable materials are diatomaceous earths, talcs, clay, etc., although diatomaceous earths are preferred. The amount used is about 20–40%.

*Antimony trioxide.*—This serves to increase the fire-retarding properties of the final material. The amount is about 5–15%.

*Boric acid.*—This adds to the fire-retarding properties, and is used in amount of about 7–15%.

*Mineral rubber.*—This is air-blown asphalt and it is used in amounts of 2–5%.

*Urea.*—The amount is less than 1%.

*Formaldehyde.*—The amount is less than 1%. This is believed to form a binding material with the urea.

All of the above materials may be included in the concentrate, but in many cases, some may be excluded. For example, components which may be omitted include pale oil, the phosphate, anti-foam, plasticizer, phosphatide, mineral rubber and urea and formaldehyde.

Generally, the foregoing materials are mixed in a specific order to obtain best results. The coal oil and wetting agent and the phosphatide, if used, are blended and stirred continuously until thoroughly emulsified and then the organic solvent is added with constant stirring. Next the protective colloidal soap or its constituents are added and blended with the foregoing mixture. Then at this stage or at any of several other convenient times, the pale oil is added. Then the anti-foaming agent and plasticizer and urea and formaldehyde may be added. At this point the hydrocarbon dispersion medium is complete and is ready for addition of solids. First the copper compound may be added, followed by the insecticide or fungicide. Then the alkali borate, the phosphate, fire retardant mineral filler, antimony trioxide, boric acid and, when used, mineral rubber. Upon addition of the fire-retardant mineral filler, and with constant stirring, the formulation assumes a solid state which constitutes the flame-retarding composition in crude form.

For commercial attractiveness the solid composition after setting up finally is preferably dried and ground to a consistency and fineness of approximately 250 mesh.

In this finely ground state the composition may be conveniently shipped to consumers. It should be appreciated that the novel flame retardant preparation contains hydrocarbons as the dispersion medium, aided by the solubility effects of chlorinated hydrocarbons, preferably perchloroethylene, and also aided by powerful mechanical peptizers. In this manner a permanent colloidal mix is obtained which avoids completely the prior art requirement of an aqueous base in fireproofing compositions. As mentioned earlier, the blistering effect and bubble formations encountered by the prior art compositions upon the application of heat simply do not occur with the hereindescribed invention.

For example, upon application to roofing felt laid on a wood base this mixture withstands direct blowtorch heating for one hour without any more damage than a hole through the roofing paper, and carbonization of the felt and wood base. The flame will not continue upon the removal of the torch, nor are there any ancillary bad effects evident to the surrounding area proximate to the area to which the heat is directed.

Illustrating this application, one part of the above preferred formulation was added to about five parts by weight of a pre-melted commercial asphalt which had been softened somewhat by addition of a small amount of peanut oil 2 ounces to a gallon of the formulation. This mixing was accomplished by constant stirring until a thoroughly uniform mixture was obtained.

The conventional methods were then employed to manufacture the roofing felt by impregnating roofing materials, e.g., asbestos fibers or papers, with the above blended mixtures. The composition in the asphalt may be applied either by spraying, dipping, brushing or any other known manner. The term "flash point" as used in the ordinary meaning of the term in the fireproofing art, is meaningless as applied to the composition of this invention since the flash point would be so extremely high. The prepared mix when prepared according to the foregoing description has been found to withstand temperatures up to 2000° F. (direct blowtorch heating) for over one hour without causing the flame to continue spontaneously.

If desired, the one-to-five blend of the composition and the pre-melted commercial asphalt may be further mixed with an amount not more than 2% to 5% (parts by weight) of mineral rubber, i.e., air blown asphalt. This may be done just before rolling the roofing felt.

The ratio of the fireproofing material to asphalt can be from 1 to 4.5 up to 1 to 5.5, but as stated is preferably 1 to 5.

When mineral rubber is added it is preferably used in an amount of 0.03 to 0.05 part for each part of the mixture of fireproofing material and asphalt.

The composition mixed with the pre-melted asphalt also finds application in treating fiber glass for roofing purposes or for thermal insulation in walls and attics, making them infinitely more fire resistant.

In the latter case there should be added to the prepared mix finely ground, clean, washed sand or Minn. Mining & Milling ground rock in an amount preferably equal to the total weight of the mix. The reason for this is that it gives a much better body to the formulation. It should be observed that this formulation including the sand can also be used for roofing felt.

*Example 1*

[Based on preparing 100 gallons of the fireproofing composition]

A mixture of 5½ ounces of an emulsifying wetting agent (a sodium octyl phosphate having the formula $Na_5R_5(P_3O_{10})_2$ where R is the ethyl hexyl group) and 7 ounces of lecithin is blended into one gallon of coal oil with continuous stirring until thoroughly emulsified, at which point one and one-half gallons of perchloroethylene are blended in which constant stirring.

Separately mix together 11.2 pounds of monoethanolamine and 2.4 pounds of oleic acid and add the foregoing blended emulsion with constant stirring.

Add one and three-quarters of an ounce of an anti-foaming agent. With continued stirring add a separately blended mixture of a pound of copper oxide and 3.2 pounds of hexahydrobenzoic acid.

Successively add 1.5 pounds of sodium fluoride or any alkali fluoride and 445 pounds of borax, and finally add 200 pounds of 300 mesh diatomaceous earth.

The resulting formulation in solid state was found very effective as a fire retardant composition when dried and ground to a fine powder and incorporated into convenient carrier materials like asphalt for roofing felts and treating fiber glass for thermal insulation in walls or attics.

*Example 2*

Example 1 was repeated but 200 pounds of 300 mesh talc was substituted for the diatomaceous earth filler.

*Example 3*

6½ pounds of pale oil (250° F. flash point) were added to the composition of Example 1 prior to adding the anti-foaming agent.

Example 4

To the composition of Example 3 were added 2.2 pounds of tricresyl phosphate.

Example 5

100 pounds of diammonium phosphate and 6.6 pounds of boric acid were added to the composition of Example 4.

Example 6

To 100 gallons of the composition prepared in Example 1 were added 800 gallons of pre-melted asphalt and 200 ounces of peanut oil. (In place of peanut oil other vegetable oils can be used and the oil can be omitted completely where a soft final product is not desired.)

Example 7

To 1 part by weight of the composition of Example 6 there was added 1 part of air blown asphalt (mineral rubber).

Example 8

To prepare 100 gallons of the composition 5.5 ounces of sodium lauryl sulfate and 7 ounces of lecithin were blended with 1 gallon of coal oil. Then 1.5 gallons of perchloroethylene were added. To this mixture was added a mixture of 11.2 lbs. of monoethanolamine and 2.4 lbs. of oleic acid. Next 6.5 lbs. of pale oil was added with stirring and then 1.75 ounces of dimethyl siloxane antifoaming agent. There was then added 2.2 lbs. of tricresyl phosphate followed by a blend 1 lb. of cupric oxide and 3.2 lbs. of cyclohexane monocarboxylic acid. Successively there were added 1.5 lbs. of sodium fluoride (alternatively other alkali fluorides can be used), 100 lbs. of diammonium phosphate, 445 lbs. of borax, 50 lbs. of antimony trioxide and 200 lbs. of diatomaceous earth. The mixture was tumbled and ground to a fineness of 250 mesh.

To 1 part of this mixture by weight was added 8 parts by weight of pre-melted asphalt.

Example 9

Example 8 was repeated replacing the sodium lauryl sulfate by the same amount of Victawet 35B.

Example 10

Example 9 was repeated but the 445 lbs. of borax was replaced by 400 lbs. of ammonium sulfate, 45 lbs. of borax and 6.6 lbs. of boric acid. The 200 lbs. of diatomaceous earth were replaced by an equal amount of talc. The dried and ground powder can be added to paints or creosote to render them fire retardant, or other construction materials like wood or Celotex.

Example 11

The following materials are mixed in accordance with the above procedure:

| Material | Amount |
|---|---|
| Sodium octyl phosphate having the formula $Na_5R_5(P_3O_{10})_2$ in which R is the ethyl hexyl group _____ lbs__ | 2.5 |
| Anti-foaming agent _____ oz__ | .32 |
| Perchloroethylene _____ lbs__ | 32.0 |
| Formaldehyde _____ lbs__ | 5.5 |
| Urea _____ lbs__ | 5.5 |
| Oleic acid _____ lbs__ | 5.5 |
| Monoethanolamine _____ lbs__ | 5.5 |
| Tricresyl phosphate _____ lbs__ | 3.5 |
| Copper napthenate, 8% _____ lbs__ | 47.0 |
| Peanut oil _____ lbs__ | 8.0 |
| Pearl oil _____ lbs__ | 16.0 |
| Sodium fluoride _____ lbs__ | 2.5 |
| Borax (anhydrous) _____ lbs__ | 609.5 |
| Diammonium phosphate _____ lbs__ | 240.0 |
| Boric acid _____ lbs__ | 252.0 |
| Antimony trioxide _____ lbs__ | 157.0 |
| Diatomaceous earth _____ lbs__ | 738.0 |
| Mineral rubber, 2% of the above components. | |

The resulting material is an excellent flame retardant.

In the above examples, it will be noted that the amount of hydrocarbon dispersion medium is generally less than about 10% of the total weight of the composition, and preferably this is about 5–8%. This includes the weight of coal oil, wetting agent, phosphate, organic solvent, soap, pearl oil, anti-foaming agent, plasticizer, copper compound and insecticide and/or fungicide. The remaining 90 or more percent is of solid fire-retardant mineral filler and other flame preventing solids.

It will be appreciated that while the invention has now been described to refer to specific embodiments that various changes in modifications may be made in the details of the compositions and the methods of making and using them without departing from the scope of the invention as this is defined in the claims.

What is claimed is:

1. A non-aqueous fire-retardant composition consisting essentially of
   (a) a dispersion medium consisting essentially of about
      ½–1% by weight coal oil,
      $\frac{1}{10}$–$\frac{7}{100}$% by weight phosphatide,
      1–1.5% by weight wetting agent,
      1.2–1.6% by volume an organic solvent miscible with coal oil and capable of dissolving the phosphatide and wetting agent,
      the foregoing percentages being based upon the final non-aqueous fire-retardant composition, and
   (b) for each gallon of the final fire-retardant composition about
      4–5 pounds alkali metal borate,
      1.9–2.1 pounds inert fire-retardant mineral filler.

2. A non-aqueous fire-retardant composition consisting essentially of
   (a) a dispersion medium consisting essentially of about
      ½–1% by weight coal oil,
      $\frac{7}{100}$–$\frac{1}{10}$% by weight phosphatide,
      1–1.5% by weight wetting agent,
      1.2–1.6% by volume an organic solvent miscible with coal oil and capable of dissolving the phosphatide and wetting agent,
      5–10% by weight protective colloidal soap,
      the foregoing percentages being based upon the final non-aqueous fire-retardant composition, and
   (b) for each gallon of the final fire-retardant composition about
      4–5 pounds alkali metal borate,
      1.9–2.1 pounds inert fire-retardant mineral filler.

3. A non-aqueous fire-retardant composition which contains inert fire-retardant mineral filler consisting essentially of:
   (a) a dispersion medium consisting essentially of
      (1) about
         ½–1% by weight coal oil,
         $\frac{1}{10}$–$\frac{7}{100}$% by weight phosphatide,
         1–1.5% by weight wetting agent,
         1.2–1.6% by volume of an organic solvent miscible with coal oil and capable of dissolving the phosphatide and wetting agent,
         5–10% by weight protective colloidal soap,
         the foregoing percentages being based upon the final non-aqueous fire-retardant composition,
      (2) about 1–50% by weight pale oil based on the weight of said carboxylic acid soap,
      (3) about
         1 pound of copper oxide,
         3 pounds cyclohexane carboxylic acid,
         1.5 pounds alkali fluoride,
         for each 100 gallons of the final non-aqueous fire-retardant composition,
      (4) about 1–2% by weight of inert fire-retardant plasticizer based on the weight of inert fire-retardant mineral filler,
   (b) for each gallon of final fire-retardant composition about 4-5 pounds alkali metal borate,
1.9-2.1 pounds inert fire-retardant mineral filler,
0.7-1.0 pound of an ammonium phosphate,
0.4-0.6 pound antimony trioxide.

4. A non-aqueous fire-retardant composition as set forth in claim 3 in which the organic solvent is perchloroethylene.

5. A non-aqueous fire-retardant composition as set forth in claim 3 in which said protective colloidal soap is an amine soap.

6. A non-aqueous fire-retardant composition as set forth in claim 5 in which said soap is the reactive product of a saponifiable unsaturated fatty acid and an organic base selected from the group consisting of ethanolamines and morpholine.

7. A non-aquoeus fire-retardant composition as set forth in claim 3 in which said inert fire-retardant plasticizer is tricresyl phosphate.

8. A non-aqueous fire-retardant composition as set forth in claim 3 in which said inert fire-retardant mineral filler is a diatomaceous earth.

9. A non-aqueous fire-retardant composition consisting essentially of a blend of one part by weight of the composition of claim 3 and 4.5-5.5 parts by weight asphalt.

10. A non-aqueous fire-retardant composition consisting essentially of a blend of one part by weight of the composition of claim 3, 4.5-5.5 parts by weight asphalt and about 2-5% by weight of mineral rubber.

11. A non-aqueous fire-retardant composition consisting essentially of:
(a) a dispersion medium consisting essentially of about
½-1% coal oil,
0.1-1.5% wetting agent,
1.2-1.6% of an organic solvent miscible with coal oil and capable of dissolving the phosphatide and wetting agent,
0.5-10% protective colloidal soap,
1-100% based on the amount of protective colloidal soap of pale oil
$1 \times 10^{-3}$-$5 \times 10^{-2}$% anti-foaming agent,
0.1-2% plasticizer,
0.1-5% of a compound of copper,
0.05-0.2% sodium fluoride, and
(b) dispersed in said dispersion medium about
20-60% alkali metal borate,
8-12% inorganic phosphate,
20-40% fire-retardant mineral filler,
5-15% antimony trioxide,
7-15% boric acid,
up to 1% urea,
up to 1% formaldehyde,
2-5% mineral rubber,
said percentages except in the case of pale oil being by weight of the final fire-retardant composition.

References Cited by the Examiner
UNITED STATES PATENTS

| | | | |
|---|---|---|---|
| 1,990,811 | 2/35 | Zimmerman | 134—79 |
| 2,258,219 | 10/41 | Rochow | 174—121 |
| 2,542,721 | 2/51 | Stafford | 106—15 |
| 2,554,319 | 5/51 | Ayers | 23—148 |
| 2,678,320 | 5/54 | Scharf | 252—354 |
| 2,769,729 | 11/56 | Van de Zande | 117—137 |
| 2,940,942 | 6/60 | Hodnefield | 260—6 |
| 2,962,464 | 11/60 | Feild | 260—28.5 |
| 2,997,398 | 8/61 | Kronstein et al. | 106—14 |
| 3,080,316 | 3/63 | Petertyl et al. | 252—2 |

ALEXANDER H. BRODMERKEL, *Primary Examiner.*

MORRIS LIEBMAN, *Examiner.*